Dec. 31, 1957   H. J. BLASKOWSKI   2,818,236
HEAT EXCHANGE APPARATUS
Filed Dec. 24, 1954
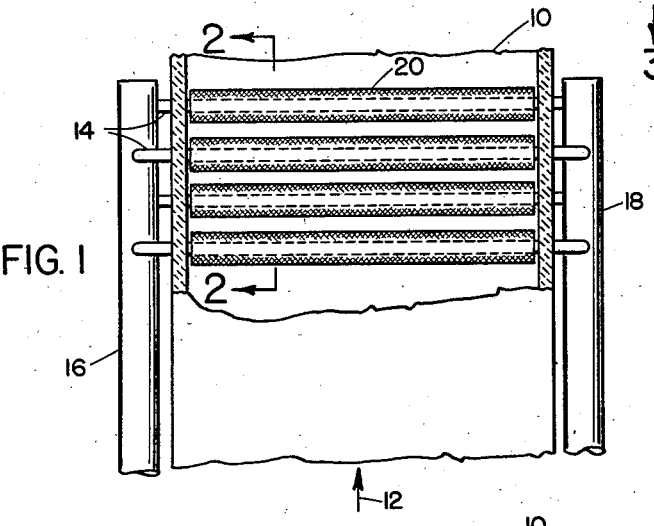
FIG. 1
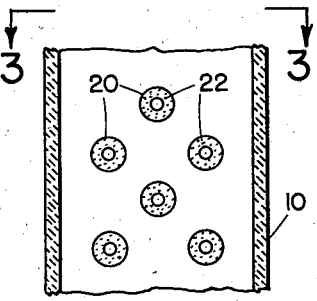
FIG. 2
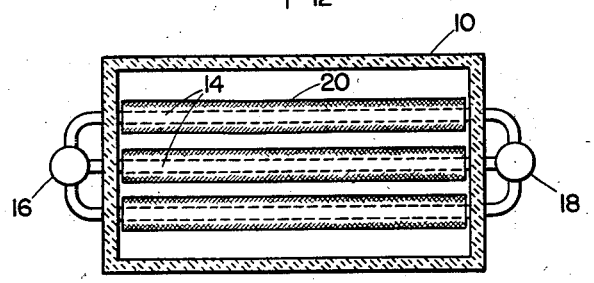
FIG. 3
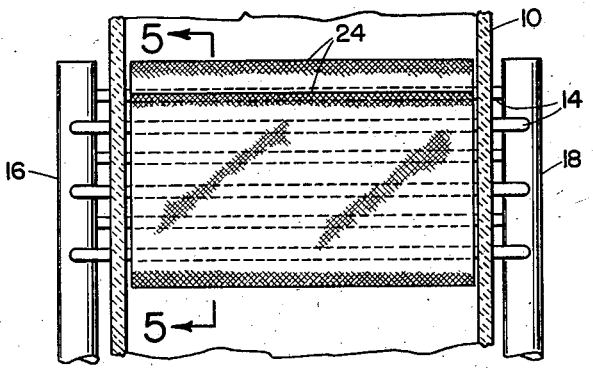
FIG. 4
FIG. 5
INVENTOR
HENRY J. BLASKOWSKI
ATTORNEY

United States Patent Office 2,818,236
Patented Dec. 31, 1957

2,818,236

HEAT EXCHANGE APPARATUS

Henry J. Blaskowski, New York, N. Y., assignor to Combustion Engineering, Inc., New York, N. Y., a corporation of Delaware Application December 24, 1954, Serial No. 477,483

5 Claims. (Cl. 257—220)

This invention relates to a heat exchange apparatus wherein heat is transferred from a heating fluid to a fluid to be heated through the medium of a metallic heat transfer wall which is contacted on one side by the heating fluid and on the other side by the fluid to be heated. The invention has specific relation to such a heat exchanger embodying a fluidized medium.

In accordance with the present invention there is provided a duct through which a hot gas, such as combustion gases generated in the furnace of a boiler or the like, is passed and into which a metallic tube or tubes extend so that the gas flows over the outer surface of the tube. Through the interior of the tube there is conducted a fluid which has a substantially greater rate of heat transfer with the wall of the tube than the corresponding rate of heat transfer of the gas flowing over the outer tube surface. Placed about the tube is a screen which, with the tube, forms a chamber into which is disposed a body of discrete material. This material is of a particle size such that the material will be fluidized by the gas flowing through the chamber and the mesh of the screen is sufficiently small relative to the particle size so as to prevent passage of the material through the screen thereby retaining the material within the chamber. With this organization the effective rate of heat transfer between the gas and the tube wall is substantially increased thereby substantially increasing the overall rate of heat transfer of the heat exchanger.

The technique of fluidization involves passing a gas through a body of discrete material at such a velocity that the body of material assumes an agitated state resembling a boiling liquid with the particles of the material moving rapidly within the mass and the mass being in what is termed a pseudo-liquid condition. When in this fluidized state the material is not carried along with the fluidizing gas and although the body of material is expanded so that it occupies considerably more volume than when in the non-fluidized state the fluidizing gas passes through the body of material and leaves the same at what is termed a disengaging zone. This type of fluidization is sometimes referred to as "dense phase" fluidization and it is to be understood that when the term fluidization is used throughout this application reference is had to this type of fluidization. When a body of material is in this fluidized condition or state the body of material has many of the properties of a liquid and the result is extremely high rates of heat transfer between the fluidizing gas and a heat exchange surface which is in contact with the fluidized material with these rates of heat exchange being in the order of 30 or 40 B. t. u./hr./ sq. ft./° F. and above, with rates as high as 100 B. t. u./ hr./sq. ft./° F. being obtainable depending upon the make up of the discrete material and the size of the particles thereof. However, the material must be fluidized to obtain these high rates of heat transfer and if the gas velocity is either too low or too high to produce fluidization these high rates will not be realized.

The rate at which heat may be transferred from one fluid to another through a heat transfer medium such as a metallic wall is in general governed by the rate of heat transfer between the fluids and the surface of the wall which they contact with the overall transfer rate, i. e., the rate at which heat is transferred from one fluid to the other fluid being generally limited by the lower of the first mentioned heat transfer rates. For example, when a heating gas is passed over the tubes of a tubular heat exchanger which has a liquid passing through the tubes thereof the overall rate of heat transfer is in effect limited by the rate of heat transfer between the heating gas and the tube with this rate of heat transfer of course being much lower than that prevailing between the tube and the liquid therewithin. This becomes evident when it is considered that the overall rate of heat transfer is determined by the equation $$R=\frac{1}{\frac{1}{RA}+\frac{1}{RB}}=\frac{RA \times RB}{RA+RB}$$

wherein R designates the overall rate of heat transfer, RA designates the rate of heat transfer between one of the fluids and the metallic heat transfer surface and RB designates the rate of heat transfer between the other fluid and the metallic heat transfer surface. It is thus evident that R is primarily dependent upon the lower of the two heat transfer rates and that a substantial increase in the higher of the two heat transfer rates does not have a pronounced effect upon the overall heat transfer rate while a substantial increase in the lower of the two heat transfer rates will have a pronounced effect on the overall heat transfer rate, depending of course upon the differential between the high and the low heat transfer rate.

Thus in a boiler constructed and operated in the usual manner wherein heat is transferred from hot combustion gases by convection to water or to steam by flowing these gases over a heat transfer wall, such as tubes, which are contacted on their opposite surface by water or steam thereby indirectly transferring heat from the combustion gases to the water or the steam to either raise the temperature of the water or convert the water to steam, or in the case of steam to superheat the steam, the rate of heat transfer between the water and the heat transfer wall as well as between the steam and the heat transfer wall is much greater than that between the combustion gases and the heat transfer wall and therefore this latter rate is the governing factor is determining the overall rate of heat transfer and therefore the amount of heat transfer surface that will be required. In order to decrease the amount of heat transfer surface that is required, the rate of heat transfer between the hot combustion gases and the metallic heat transfer surface or wall over which they flow is, in accordance with the present invention, greatly increased by retaining a discrete material in contact with this surface with this material being maintained in a fluidized condition by the gases flowing therethrough. By raising this rate of heat transfer the overall heat transfer rate will obviously be greatly increased thereby greatly reducing the amount of surface required.

It is an object of this invention to provide an improved heat transfer apparatus embodying a fluidized medium.

Other and further objects of the invention will become apparent to those skilled in the art as the description proceeds.

With the aforementioned objects in view, the invention comprises an arrangement, construction and combination of the elements of the invention organization in such a manner as to attain the results desired as hereinafter more particularly set forth in the following detailed description of an illustrative embodiment, said embodiment being shown by the accompanying drawing wherein:

Figure 1 is an elevational view of a heat exchanger embodying the present invention and having the front wall of the gas duct broken away to show the disposition of the tubes within the duct.

Figure 2 is a sectional view taken along line 2—2 of Figure 1.

Figure 3 is a transverse section along lines 3—3 of Figures 1 and 2.

Figure 4 is a view similar to that of Figure 1 showing a modified form of construction.

Figure 5 is a sectional view taken along line 5—5 of Figure 4.

Referring now to the drawing wherein like reference characters designate like elements, the preferred embodiment of the improved heat exchanger of the present invention disclosed therein comprises a gas duct 10 through which hot combustion gas or the like is upwardly directed as indicated by arrow 12 and laterally through which extends the heat exchange tubes 14. These tubes are staggered with relation to one another laterally of the duct 10 and have their inlets connected with a supply header 16 and their outlets connected with a collecting header 18. Water or some other suitable fluid which has a heat exchange rate between it and the wall of the tubes 14 which is substantially greater than that which would ordinarily prevail between the gas flowing through duct 10 and the wall of tubes 14 over which this gas flows is conveyed through the tubes 14 from the header 16 and after traversal of these tubes is directed into the collecting header 18 from which it is conveyed to a desired point.

Disposed about the tubes 14 are the tubular screens 20 which have a somewhat larged diameter than the diameter of the tubes and have their ends sealed to the tubes so as to form an annular chamber 22 between the screens and the outer surface of the tubes. Within each of the chambers 22 is provided a body of discrete material which is such a particle size that the portion of the gases flowing through duct 10 that pass through the tubular screens 20 and up through the body of material fluidizes this material. The screens 20 are of course of such a mesh as to prevent the material from passing therethrough but allow the gases to pass into the chamber 22 and fluidize the material therewithin.

Thus when hot gases are passing upwardly through duct 10 each of the tubes 14 will have a relatively thin layer of fluidized material disposed thereabout resulting in greatly increasing the rate of heat transfer from this gas to the tube walls producing a greatly increased overall rate of heat transfer between the heating gas and the fluid flowing through the tubes while at the same time requiring a minimum of fluidized material and producing a minimum draft loss or pressure drop across the heat exchange apparatus.

The modified embodiment of the present invention disclosed in Figs. 4 and 5 is generally similar to the embodiment of Figs. 1, 2, and 3 except that in lieu of having individual screens for each of the tubes 14 several vertically aligned tubes are enclosed within a single elongated screen member 24, as best shown in Fig. 5 with this arrangement being preferable when the vertical spacing of the tubes is relatively small.

In each of the disclosed embodiments adjacent screen members are spaced from each other sufficiently to provide a substantial cross sectional area in the duct that is unrestricted by the fluidized medium so that the draft loss will be low with the advantages obtained by fluidization still being realized.

With the heat exchange apparatus of this invention it will be seen that the overall heat transfer rate between the heating medium and the fluid to be heated is greatly increased thereby reducing the size of heat exchanger required for a given capacity making the unit much more economical and efficient while the amount of fluidized material and the resulting draft loss produced thereby are maintained at a minimum.

While I have illustrated and described a preferred embodiment of my novel organization it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

What I claim is:

1. A heat exchange apparatus comprising a passageway having a hot gas flowing therethrough, a metallic tube extending into said passageway generally transversely of the direction of gas flow so said gases flow over the outer surface thereof, said tube having a fluid to be heated flowing therethrough which has a substantially greater rate of heat transfer with the tube wall than the corresponding normal rate of heat transfer of said gas, a screen surrounding said tube and forming therewith an enclosed chamber, a body of discrete material disposed within said chamber, said material being of a particle size such that the material is fluidized by the flow of gas therethrough and the mesh of said screen being so related to the particle size as to prevent passage of the material therethrough.

2. A heat exchanger apparatus comprising a passageway having a hot gas flowing therethrough, a plurality of metallic tubes extending into said passageway generally transversely of the direction of gas flow so said gases flow over the outer surface thereof, said tubes having a fluid to be heated flowing therethrough which has a substantially greater rate of heat transfer with the tube wall than the corresponding normal rate of heat transfer of said gas, individual tubular screens surrounding each of said tubes and forming therewith an annular enclosed chamber, a body of discrete material disposed within said annular chambers, said material being of a particle size such that the material is fluidized by the flow of said gas therethrough and the mesh of said screen being so related to the particle size as to prevent passage of the material therethrough.

3. A heat exchange apparatus comprising a passageway having a hot gas flowing therethrough, a plurality of metallic tubes extending into said passageway generally transversely of the direction of gas flow so said gases flow over the outer surface thereof, said tubes having a fluid to be heated flowing therethrough which has a substantially greater rate of heat transfer with the tube wall than the corresponding normal rate of heat transfer of said gas, groups of said tubes being surrounded by individual screens each of which is constructed to form an enclosed chamber with the tubes of a single group disposed therewithin, each of said chambers having a body of discrete material disposed therewithin with the material being of a particle size such that it is fluidized by said gas flow, the mesh of said screen being so related to the particle size of the material as to prevent passage of the material therethrough.

4. A heat exchange apparatus comprising a passageway having a hot gas flowing therethrough, a plurality of metallic tubes extending into said passageway generally transversely of the direction of gas flow so said gases flow over the outer surface thereof, said tubes having a fluid to be heated flowing therethrough which has a substantially greater rate of heat transfer with the tube wall than the corresponding normal rate of heat transfer of said gas, a body of discrete material in contact with the outer surface of each of said tubes, a plurality of independent screen members associated with said tubes in a manner to retain said material in contact with said tubes, said screen members being spaced from each other and disposed in said passageways in such manner as to provide passages therebetween for the flow of hot gases, said discrete material being of a particle size such that the material is fluidized by the flow of said gases therethrough.

5. A heat exchange apparatus comprising a vertically disposed passageway upwardly through which a stream of hot gases is conveyed, a plurality of metallic tubes extending into said passageway generally transversely of the di— rection of gas flow, a plurality of screen members associated with the tube portions within said passageway with each screen member being disposed to form an enclosed chamber about said tube portions with certain of the screen members being spaced laterally of each other to provide passages therebetween for the flow of hot gases, a discrete material disposed in said enclosed chambers, said material being of such a size that it is fluidized by said stream of hot gases but does not pass through said screens.

References Cited in the file of this patent

UNITED STATES PATENTS 2,620,262     Hujsak et al. _____ Dec. 2, 1952